US008532032B2

(12) United States Patent
Cai et al.

(10) Patent No.: US 8,532,032 B2
(45) Date of Patent: Sep. 10, 2013

(54) DYNAMIC SCHEDULING OVERWRITING OF SEMI-PERSISTENT ALLOCATION IN AN UPLINK

(75) Inventors: Zhijun Cai, Euless, TX (US); James Earl Womack, Bedford, TX (US); Yi Yu, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 848 days.

(21) Appl. No.: 12/050,782

(22) Filed: Mar. 18, 2008

(65) Prior Publication Data

US 2009/0238120 A1    Sep. 24, 2009

(51) Int. Cl.
*H04W 4/00* (2009.01)
*H04J 3/00* (2006.01)

(52) U.S. Cl.
USPC .......................................... 370/329; 370/345

(58) Field of Classification Search
None
See application file for complete search history.

(56) References Cited

U.S. PATENT DOCUMENTS

| | | | |
|---|---|---|---|
| 6,717,927 B2 | 4/2004 | Chao et al. | |
| 2005/0068922 A1 | 3/2005 | Jalali | |
| 2006/0256745 A1* | 11/2006 | Chao et al. | 370/295 |
| 2008/0117891 A1* | 5/2008 | Damnjanovic et al. | 370/345 |

FOREIGN PATENT DOCUMENTS

| | | |
|---|---|---|
| CN | 1647555 A | 7/2005 |
| EP | 1890422 A2 | 2/2008 |
| JP | 2010502106 A | 1/2010 |
| KR | 20050116076 A | 12/2005 |
| KR | 20070038414 A | 4/2007 |
| WO | 2003041437 A1 | 5/2003 |
| WO | 2008024321 A2 | 2/2008 |
| WO | 2008024890 A2 | 2/2008 |

OTHER PUBLICATIONS

3GPP TSG-RAN WG2 Meeting #60bis R2-080015, Criteria for Short and Long BSR, Jan. 14-18, 2008, whole document.*
3GPP TSG-RAN WG2 Meeting #60bis R2-080121, Collision avoidance in uplink semi-persistent scheduling for TDD, Jan. 14-18, 2008, whole document.*
PCT International Search Report; PCT Application No. PCT/US2009/034675; Oct. 6, 2009; 4 pgs.
PCT Written Opinion of the International Searching Authority; PCT Application No. PCT/US2009/034675; Oct. 6, 2009; 7 pgs.
Jiang, Dajie, et al.; "Principle and Performance of Semi-persistent Scheduling for VoIP in LTE System"; IEEE paper #1-4244-1312; May 7, 2007; pp. 2861-2864.
Catt; "VoIP Scheduling Procedure"; 3GPP TSG RAN WG2 #60bis; R2-080122; Sevilla, Spain; Jan. 14-18, 2008; 3 pgs.
Research in Motion, Ltd.; "Large IP Packet Delivery during VoIP Sessions"; 3GPP TSG-RAN-WG2 Meeting #60bis; R2-080062; Sevilla, Spain; Jan. 14-18, 2008; 3 pgs.

(Continued)

*Primary Examiner* — Chirag Shah
*Assistant Examiner* — Srinivasa Reddivalam
(74) *Attorney, Agent, or Firm* — Conley Rose, P.C.; J. Robert Brown, Jr.

(57) ABSTRACT

A user equipment (UE) comprising a processor such that, responsive to the UE having a large packet to transmit and where the large packet is larger than a semi-persistent resource allocated to the UE, the processor is configured to promote transmission of a buffer status report in one of the allocated semi-persistent resources and receive a dynamically allocated resource for transmitting the large packet.

3 Claims, 5 Drawing Sheets

(56) References Cited

OTHER PUBLICATIONS

Research in Motion Limited; "Various Issues Regarding SR Channel Handling (UL semi-persistent scheduling request, DRX . . . )"; 3GPP TSG-RAN-WG2 Meeting #61; R2-080811; Sorrento, Italy; Feb. 11-15, 2008; 2 pgs.
European Search and Examination Report; EP Application No. 08153861.3; Jul. 2, 2008; 9 pgs.
PCT International Preliminary Report on Patentability; PCT Application No. PCT/US2009/034675; Sep. 30, 2010; 9 pgs.
Extended European Search Report; Application No. 09721666.7; Mar. 15, 2011; 9 pgs.
Korean Office Action; Application No. 10-2010-7022976; Feb. 28, 2012; 15 pages.
Japanese Office Action; Application No. 2011-500836; Oct. 22, 2012; 5 pages.
Chinese Office Action; Application No. 200980118047.5; Dec. 28, 2012; 18 pages.
3GPP TSG-RAN WG2 #61; "BSR for Persistent Scheduling"; R2-081070; Sorrento, Italy; Feb. 11-15, 2008; 5 pages.
Australian Office Action; Application No. 2009225899; Jul. 16, 2012; 3 pages.
Korean Office Action; Application No. 10-2010-7022976; Sep. 28, 2012; 7 pages.
3GPP TSG-RAN WG2 Meeting #60bis; "Criteria for Short and Long BSR"; R2-080015; Sevilla, Spain; Jan. 14-18, 2008; 6 pages.
3GPP TSG-RAN WG2 Meeting #60bis; "Collision Avoidance in Uplink Semi-Persistent Scheduling for TDD"; R2-080121; Sevilla, Spain; Jan. 14-18, 2008; 5 pages.
Canadian Office Action; Application No. 2,718,719; Jan. 24, 2013; 3 pages.
Korean Notice of Allowance; Application No. 10-2010-7022976; Jan. 31, 2013; 3 pages.
European Examination Report; Application No. 09721666.7; Feb. 12, 2013; 6 pages.
Japanese Office Action; Application No. 2011-500836; Feb. 19, 2013; 5 pages.
3GPP TSG-RAN WG2 Meeting #57; "Uplink Scheduling for VoIP"; R2-070476; St. Louis, Missouri; Feb. 12-16, 2007; 8 pages.

\* cited by examiner

DYNAMIC SCHEDULING OVERWRITING OF SEMI-PERSISTENT ALLOCATION IN AN UPLINK

BACKGROUND

Easily transportable devices with wireless telecommunications capabilities, such as mobile telephones, personal digital assistants, handheld computers, and similar devices, will be referred to herein as user equipment (UE). The term "user equipment" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A UE might communicate with a second UE, some other element in a telecommunications network, an automated computing device such as a server computer, or some other device. A communications connection between a UE and another component might promote a voice call, a file transfer, or some other type of data exchange, any of which can be referred to as a call or a session.

As telecommunications technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched-based voice communication over the Internet. The term "VoIP" will refer herein to any packet switched voice call connected via the Internet, regardless of the specific technology that might be used to make the call.

For a wireless VoIP call, the signal that carries data between a UE and an ENB can have a specific set of frequency, code, and time parameters and other characteristics that might be specified by the ENB. A connection between a UE and an ENB that has a specific set of such characteristics can be referred to as a resource. An ENB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user equipment (UE) is provided that includes a processor such that, responsive to the UE having a large packet to transmit and where the large packet is larger than a semi-persistent resource allocated to the UE, the processor is configured to promote transmission of a buffer status report in one of the allocated semi-persistent resources and receive a dynamically allocated resource for transmitting the large packet.

In another embodiment, a method is provided for a user equipment (UE) to transmit a packet larger than each of a plurality of semi-persistently allocated resources. The method includes transmitting a buffer status report related to the larger packet in one of the semi-persistently allocated resources.

In another embodiment, component in a telecommunications network is provided. The component includes a processor configured to promote allocating a semi-persistent resource and to promote receiving a buffer status report in one of the semi-persistent resources. The processor is further configured to promote dynamically allocating a resource with a capacity based on information in the buffer status report.

In another embodiment, a method is provided. The method includes allocating a semi-persistent resource to a user equipment (UE), receiving a buffer status report from the UE in one of the semi-persistent resources, and dynamically allocating a resource to the UE with a capacity based on the buffer status report.

A four-step process might be followed in allocating an uplink resource to a UE so that the UE can transmit data to an ENB. In the first step, the UE sends an indicator, which is typically a single data bit, to the ENB over a scheduling request channel. The scheduling request channel is a dedicated channel between the UE and the ENB that is traditionally established specifically for the purpose of providing the UE a channel for requesting resources from the ENB. When the UE places an indicator on the scheduling request channel, the ENB interprets this as a request for resources.

In the second step, upon receiving the indicator from the UE, the ENB assigns the UE a minimal amount of resource capacity. In the third step, the UE uses this limited resource capacity to send the ENB a buffer status report that informs the ENB of the quantity of data the UE wishes to send as well as other information such as QoS (Quality of Service) information. The ENB uses this information to determine the quantity of resource capacity the UE will need for the data the UE wishes to send. In the fourth step, the ENB allocates to the UE the amount of resource capacity appropriate for the data quantity and any QoS requirements or other considerations specified in the buffer status report. This resource capacity is then allocated for subsequent data packets that the UE transmits to the ENB.

This procedure of determining resource capacity one time and then periodically allocating substantially the same resource capacity can be referred to as semi-persistent scheduling. That is, in semi-persistent scheduling, the capacity of multiple resources is allocated based on a single scheduling request. In some cases, the same resource as well as the same resource capacity is allocated based on the single scheduling request. A call can be said to employ dynamic scheduling if a scheduling request results in the allocation of a single non-periodic resource of known duration. That is, in dynamic scheduling, a resource allocation is valid for only one transmission request, and the same resource capacity is not necessarily allocated for subsequent requests.

Compressed VoIP packets typically have a size of approximately 35 to 40 bytes. Due to this relatively constant size, semi-persistent scheduling can be employed for VoIP calls since an ENB can allocate resources of this size to substantially all of the packets in the VoIP call. However, in some cases, a UE might attempt to transmit a VoIP packet or other packet that is too large for a semi-persistently allocated resource. For example, a resource allocated through semi-persistent scheduling to carry compressed VoIP packets may not be large enough to successfully carry an uncompressed VoIP packet. The following discussion will focus on the transmission of VoIP packets, but it should be understood that similar considerations could apply to transmissions of other data packets for which semi-persistent scheduling might be appropriate.

At least three possible solutions exist to handle packets that may be too large for a semi-persistent resource. In a first solution, a resource for a large packet might be dynamically scheduled independently of the ongoing semi-persistent scheduling. The large packet could then be transmitted over the dynamically allocated resource. This solution can be referred to as dynamic scheduling overwrite.

In a second solution, the modulation and coding scheme being used for the semi-persistently scheduled packets might be temporarily modified to accommodate the large packet. For example, if quadrature phase shift keying (QPSK) is used as a modulation and coding scheme, a typical, compressed VoIP packet might fit into two resources blocks, so two resource blocks might be semi-persistently allocated for each packet in a VoIP uplink. An uncompressed VoIP packet or other large packet might not fit into two resource blocks if QPSK is used. The use of a different modulation and coding scheme, such as 16-QAM (quadrature amplitude modulation), may allow a large packet to fit into two resource blocks and therefore may be considered for use in a resource dynamically allocated for a large packet. However, in some environments, the use of 16-QAM or a similar modulation and coding scheme that can accommodate larger packets in fewer resource blocks might lead to degraded radio performance and high error rates and may therefore be unsuitable as a solution for handling large packets.

In a third solution, a large packet could be broken down into smaller segments, and the smaller segments could be transmitted over multiple semi-persistently allocated resources. However, in some environments, sequential transmission of the segments over an extended series of resource blocks could lead to unacceptable delays in transmission times.

In some environments, the first solution, dynamic scheduling overwrite, may be the most desirable of these three options for handling large packets. However, dynamic scheduling overwrite might have three possible drawbacks. First, while a large packet is being transmitted over a dynamically allocated resource, a semi-persistently allocated resource that is available for use during that time but is insufficient for the large packet might not be used. If dynamic scheduling overwrite occurs often, the waste of the semi-persistently allocated resources might not be negligible. A second possible drawback to dynamic scheduling overwrite is that a synchronous uplink retransmission of a dynamically scheduled transmission may have resource collisions with a semi-persistently scheduled transmission from the same or a different UE if the retransmission and the semi-persistently scheduled transmission are placed in the same resource blocks. A third possible drawback is that the UE has no simple means readily available to request a dynamic uplink transmission resource. The UE might need to go to the random access channel to make such a request, resulting in a delay and battery drain.

In an embodiment, the first and third possible drawbacks to dynamic scheduling overwrite might be overcome by having the UE transmit a buffer status report to the ENB in a semi-persistently scheduled transmission. The buffer status report can include information related to a large packet that cannot be accommodated by a semi-persistently scheduled resource. Based on the information in the buffer status report, the ENB can dynamically allocate a resource with a size appropriate for the large packet. The UE can then transmit the large packet in the dynamically allocated resource. The ENB can determine that a packet includes a buffer status report by examining information in the packet's media access control (MAC) header fields.

Transmission of a buffer status report in a semi-persistently scheduled resource can prevent the waste of semi-persistently scheduled resources. Processing capacity and battery power might also be saved since the traditional four-step procedure for resource allocation would not be necessary for the dynamic resource allocation for the large packet. The first step of the traditional procedure, in which the UE makes a scheduling request, and the second step, in which the ENB allocates a minimal resource to accommodate the buffer status report, could be eliminated. Also, if the large packet is scheduled and transmitted promptly, it can arrive at the ENB in sufficient time to not disrupt voice communication (i.e. no dropped or discarded VoIP packets).

In an embodiment, the second possible drawback to dynamic scheduling overwrite might be overcome by aborting the retransmission of the large packet if the retransmission interferes with a semi-persistently scheduled transmission. Uplink retransmissions use synchronous retransmissions; hence a collision could occur if a semi-persistent transmission and an uplink retransmission occur over the same resource. An attempt could be made at a later time to transmit the large packet over another dynamically scheduled resource. For example, the UE could retransmit the buffer status report at a later time by dynamically requesting uplink resources from the ENB. In addition, the ENB might be provided with the capability to avoid assigning the same resource blocks for both a semi-persistently scheduled transmission and a synchronous retransmission of a dynamically scheduled transmission. Alternatively, the UE could transmit an updated buffer status report that would include sufficient resources to send the large packet retransmission as well.

Figure 1:
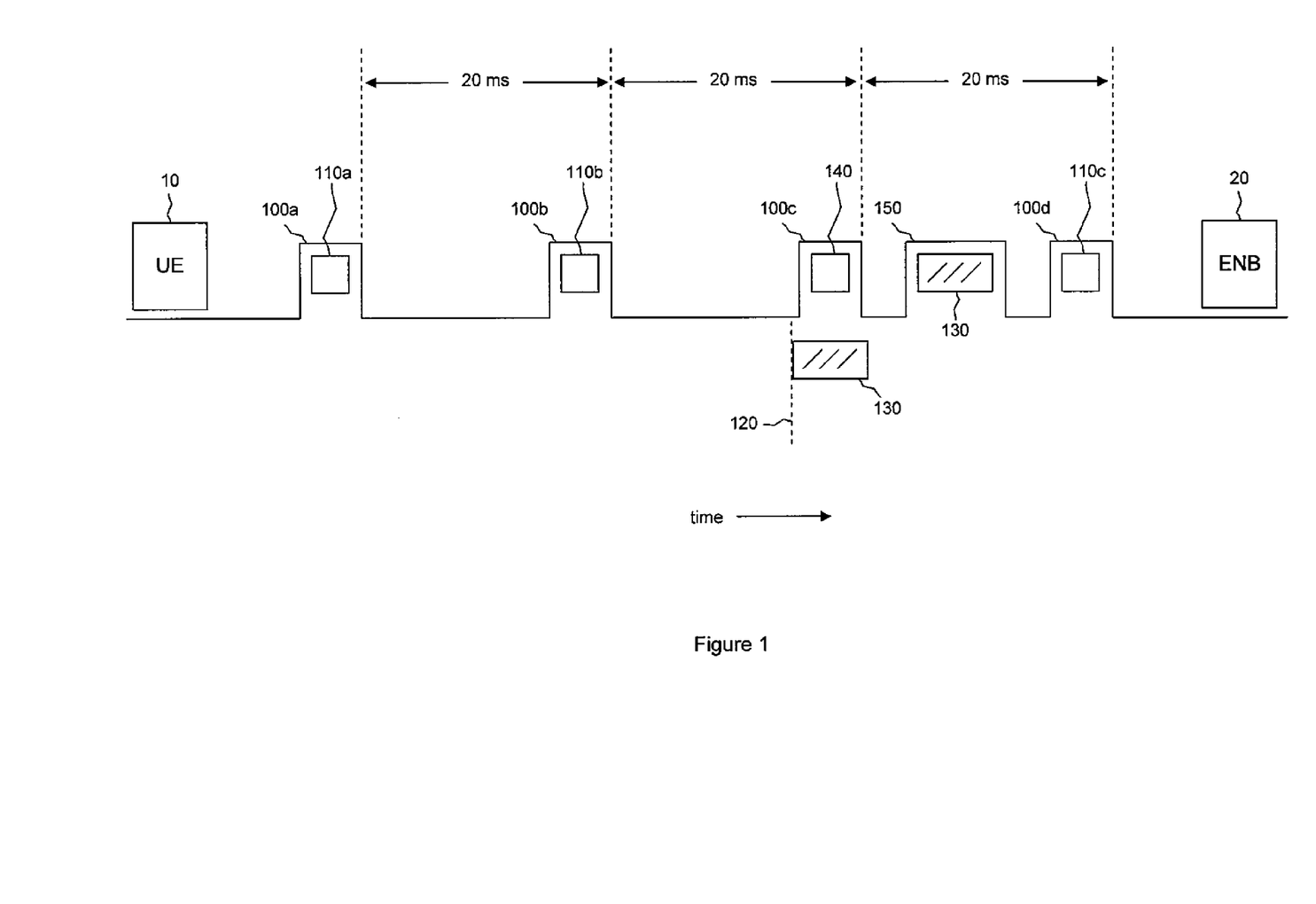
FIG. 1 is a diagram illustrating the use of a dynamic scheduling overwrite procedure according to an embodiment of the disclosure.

FIG. 1 illustrates an embodiment of the use of dynamic scheduling overwrite in this manner. A series of resources 100 of a predetermined size are semi-persistently allocated at regular time intervals for a VoIP uplink. In this case, the time interval is 20 milliseconds, but in other embodiments other time intervals could be used. A VoIP packet 110 of a predetermined size is transmitted via each of the resources 100 from a UE 10 to an ENB 20. The VoIP packets 110 are of such a size that they can reliably be carried by their respective resources 100.

At a particular time 120, the UE 10 recognizes that it needs to transmit a large packet 130 that may be too large to be reliably carried by one of the semi-persistently allocated resources 100. When this occurs, the UE 10 uses the next scheduled semi-persistently allocated resource, in this case resource 100c, to send a buffer status report 140 to the ENB 20. The buffer status report 140 informs the ENB 20 of the size and other relevant characteristics of the large packet 130. The ENB 20 uses the information in the buffer status report 140 to dynamically allocate a resource 150 that has the appropriate size and other characteristics to accommodate the large packet 130. The UE 10 then transmits the large packet 130 in the dynamically allocated resource 150. When the next semi-persistently scheduled resource, in this case resource 100d, is allocated, the UE 10 again transmits a VoIP packet of the predetermined size, in this case VoIP packet 110c.

Since a typical buffer status report might have a smaller size than the 35 to 40 bytes of a typical compressed VoIP packet, it is expected that the resource 100c will have sufficient capacity to accommodate the buffer status report 140. However, the buffer status report 140 might have more stringent QoS requirements than the VoIP packets 110. For example, while a frame error rate of 1% or less might be tolerable for the VoIP packets 110, the buffer status report 140 might need a frame error rate of 0.1% or less. The ENB 20 typically specifies the QoS parameters for the resources 100 based on the QoS requirements of the VoIP packets 110. If the same QoS parameters are applied to the resource 100c that carries the buffer status report 140, errors could occur in the transmission of the buffer status report 140 due to the more stringent QoS requirements of the buffer status report 140. The buffer status report 140 might then need to be retransmitted, which could lead to a delay in the transmission of the large packet 130.

In various embodiments, one or both of two different techniques can be used to improve the reliability of the transmission of the buffer status report 140. In one technique, the procedure known as rate matching, wherein the block size is made to match the radio frame, can be used for the resource 100c that carries the buffer status report 140. This can generate a better effective coding rate for the buffer status report 140. The rate matching procedure is typically used in cellular systems to match the generated modulated symbols to the allocated physical layer resources. In another technique, the power at which the buffer status report 140 is transmitted can be set at a higher level than the power used to transmit the VoIP packets 110. The power level offset compared to the VoIP traffic can be determined by the block error rate (BLER) requirement difference between the buffer status report 140 and the VoIP packet 110. The UE 10 might decide the power offset or the ENB 20 might signal the power offset to the UE 10.

As mentioned previously, the buffer status report 140 is typically smaller than the VoIP packets 110. Therefore, when the buffer status report 140 is transmitted in one of the resources 100 allocated for the VoIP packets 110, the entire capacity of the resource 100 may not be used. In an embodiment, a portion of one of the VoIP packets 110 might be transmitted in the same resource 100 used to transmit the buffer status report 140. This might improve the efficiency of the transmission of the VoIP packets 110.

Figure 2:
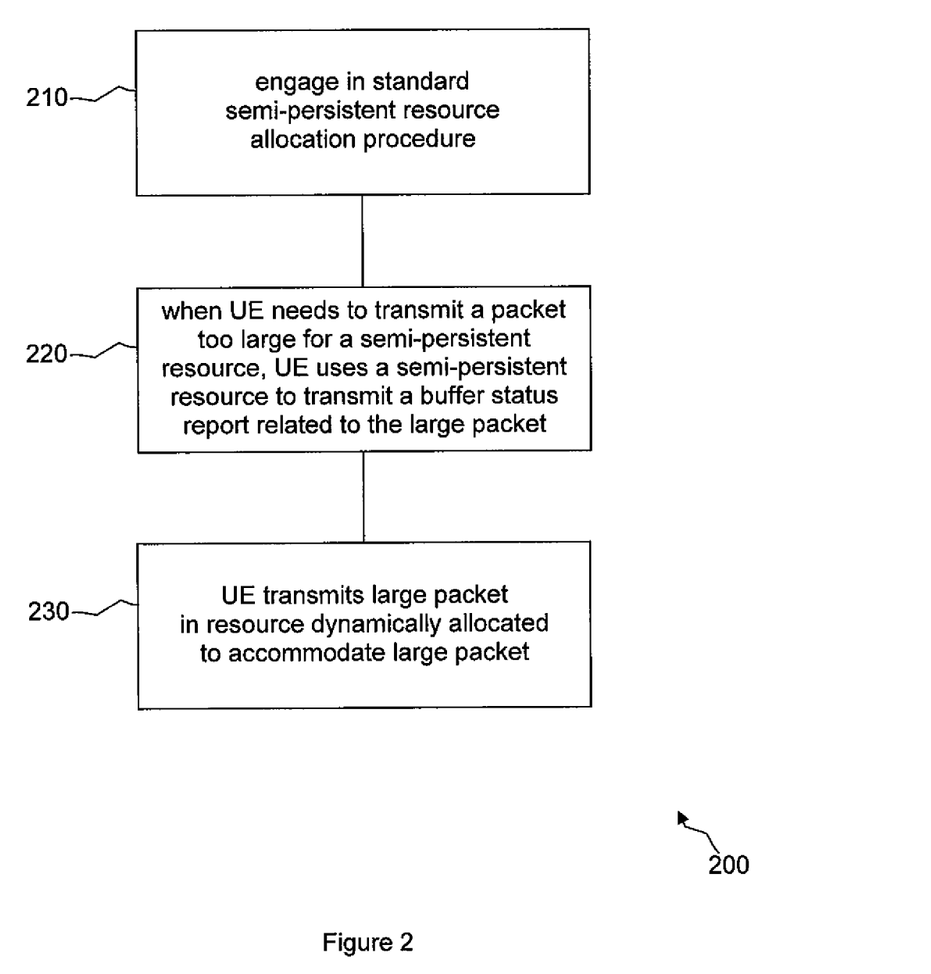
FIG. 2 is a block diagram of a method for transmitting a data packet too large to be accommodated by a semi-persistently allocated resource according to an embodiment of the disclosure.

FIG. 2 illustrates an embodiment of a method 200 for transmitting a data packet too large to be accommodated by a semi-persistently allocated resource. At block 210, a UE and an ENB engage in a standard semi-persistent resource allocation procedure that results in the ENB allocating a plurality of resources of approximately the same capacity to the UE. At block 220, when the UE needs to transmit a packet that is too large for a semi-persistent resource, the UE instead uses a semi-persistent resource to transmit a buffer status report related to the large packet. At block 230, the UE transmits the large packet in a resource dynamically allocated to accommodate the large packet.

Figure 3:
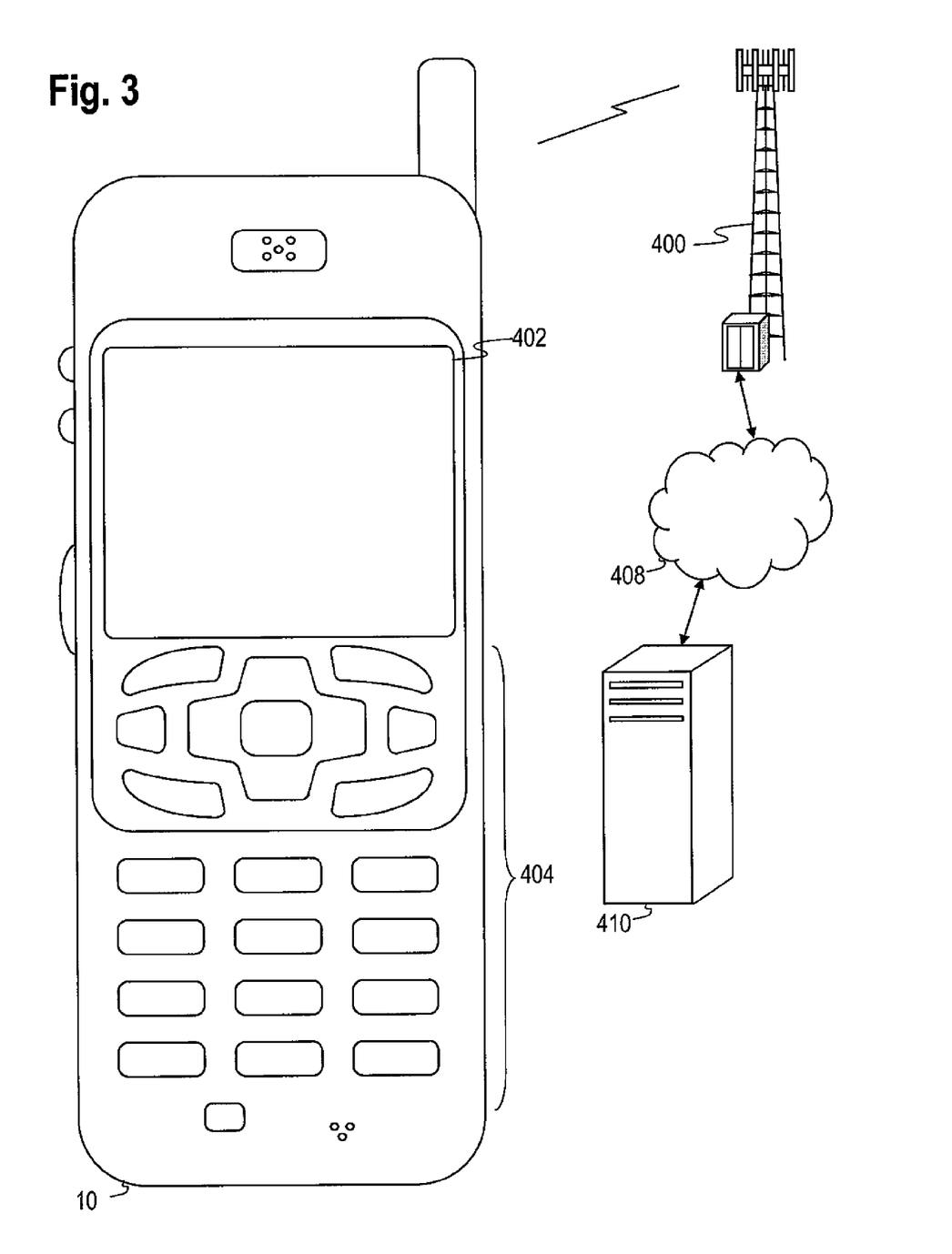
FIG. 3 is a diagram of a wireless communications system including a user equipment operable for some of the various embodiments of the disclosure.

FIG. 3 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 4:
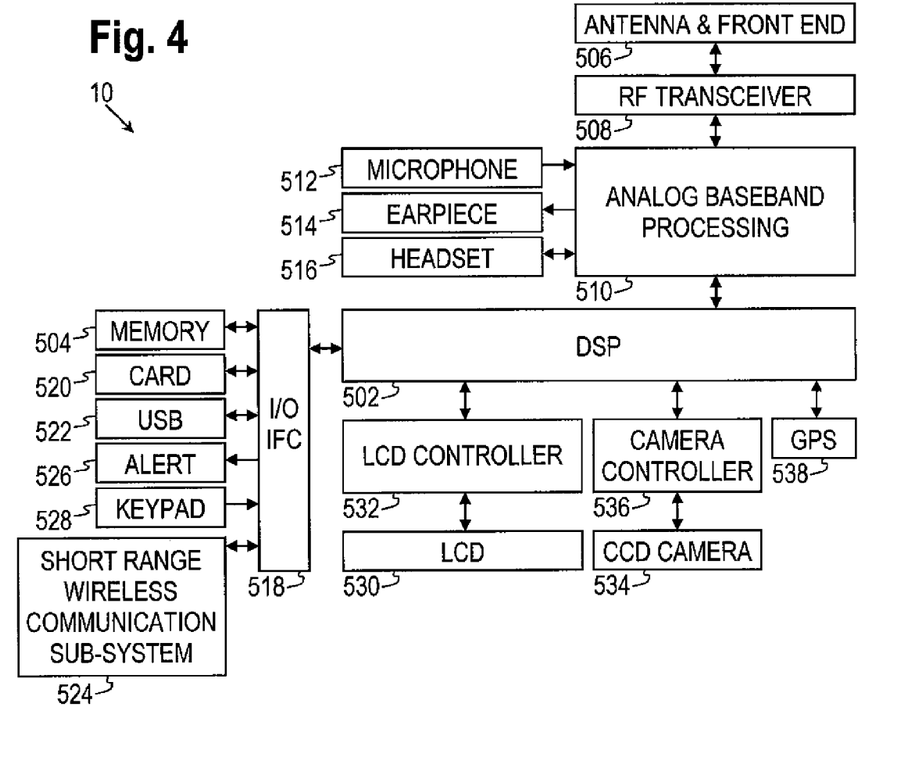
FIG. 4 is a block diagram of a user equipment operable for some of the various embodiments of the disclosure.

FIG. 4 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 5:
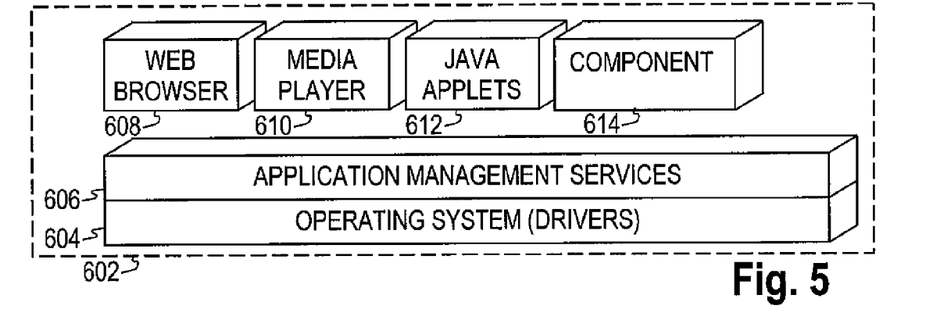
FIG. 5 is a diagram of a software environment that may be implemented on a user equipment operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 5 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might perform functions related to transmitting large data packets.

Figure 6:
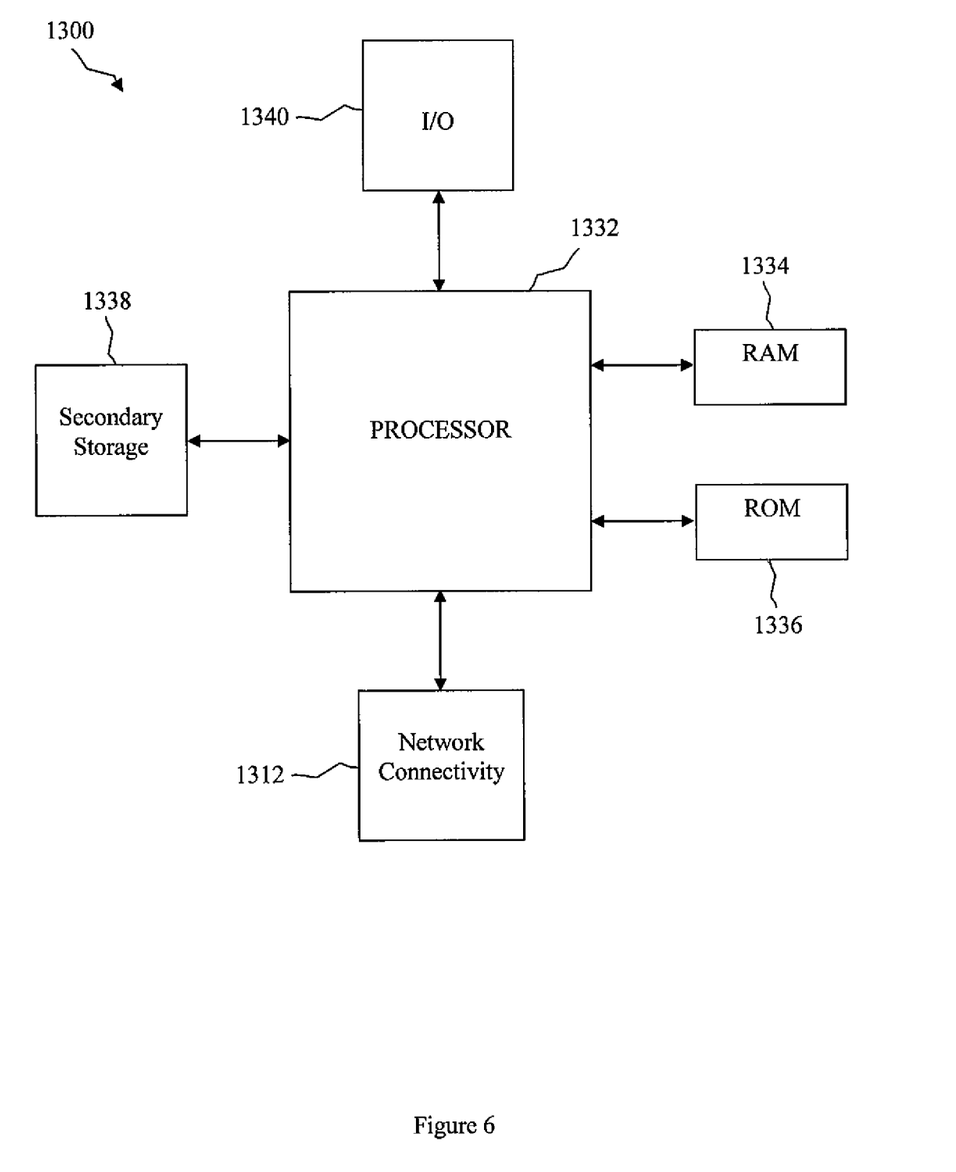
FIG. 6 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs which are loaded into RAM 1334 when such programs are selected for execution. The ROM 1336 is used to store instructions and perhaps data which are read during program execution. ROM 1336 is a non-volatile memory device which typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with an Internet or one or more intranets. With such a network connection, it is contemplated that the processor 1332 might receive information from the network, or might output information to the network in the course of performing the above-described method steps. Such information, which is often represented as a sequence of instructions to be executed using the processor 1332, may be received from and outputted to the network, for example, in the form of a computer data signal embodied in a carrier wave. The network connectivity devices 1312 may also include one or more transmitter and receivers for wirelessly or otherwise transmitting and receiving signal as are well know to one of ordinary skill in the art.

Such information, which may include data or instructions to be executed using the processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE) for use in a wireless communication network, comprising:
    a memory; and
    a processor configured to execute instructions stored in the memory such that the UE transmits a plurality of first packets, using a series of semi-persistent resources allocated at a time interval,
    wherein the UE is configured to transmit a buffer status report, using one of the semi-persistent resources for dynamically allocating a resource for a second packet that is too large to be transmitted using one of the semi-persistent resources; and
    wherein the UE is further configured to transmit the second packet, using the dynamically allocated resource, between two consecutive semi-persistent resources.

2. A method for operating a user equipment (UE) in a wireless communication network, the method comprising:
    transmitting, by the UE, a plurality of first packets, using a series of semi-persistent resources allocated at a time interval;
    transmitting, by the UE, a buffer status report, using one of the semi-persistent resources for dynamically allocating a resource for a second packet that is too large to be transmitted using one of the semi-persistent resources; and
    transmitting, by the UE, the second packet, using the dynamically allocated resource, between two consecutive semi-persistent resources.

3. A component in a telecommunications network including a user equipment (UE), the component comprising:
    a memory; and
    a processor configured to execute instructions stored in the memory to promote allocating a series of semi-persistent resources at a time interval to the UE, such that the UE transmits a plurality of first packets, using the series of semi-persistent resources;
    wherein the component is configured to receive a buffer status report from the UE, using one of the semi-persistent resources for dynamically allocating a resource for a second packet that is too large to be transmitted using one of the semi-persistent resources, and
    wherein the component is further configured to receive the second packet, using the dynamically allocated resource, between two consecutive semi-persistent resources.

* * * * *

UNITED STATES PATENT AND TRADEMARK OFFICE
CERTIFICATE OF CORRECTION

PATENT NO. : 8,532,032 B2  
APPLICATION NO. : 12/050782  
DATED : September 10, 2013  
INVENTOR(S) : Zhijun Cai et al.

Page 1 of 1

It is certified that error appears in the above-identified patent and that said Letters Patent is hereby corrected as shown below:

Title Page, Item (73) Assignee: replace "Blackberry Limited" with – "BlackBerry Limited"

Signed and Sealed this  
Fifth Day of November, 2013

Teresa Stanek Rea  
*Deputy Director of the United States Patent and Trademark Office*